July 1, 1958 — A. L. APPEL — 2,840,931
SCARIFIER ATTACHMENT FOR TRACTOR MOUNTED SHOVEL LOADERS
Filed Jan. 4, 1957 — 2 Sheets-Sheet 1
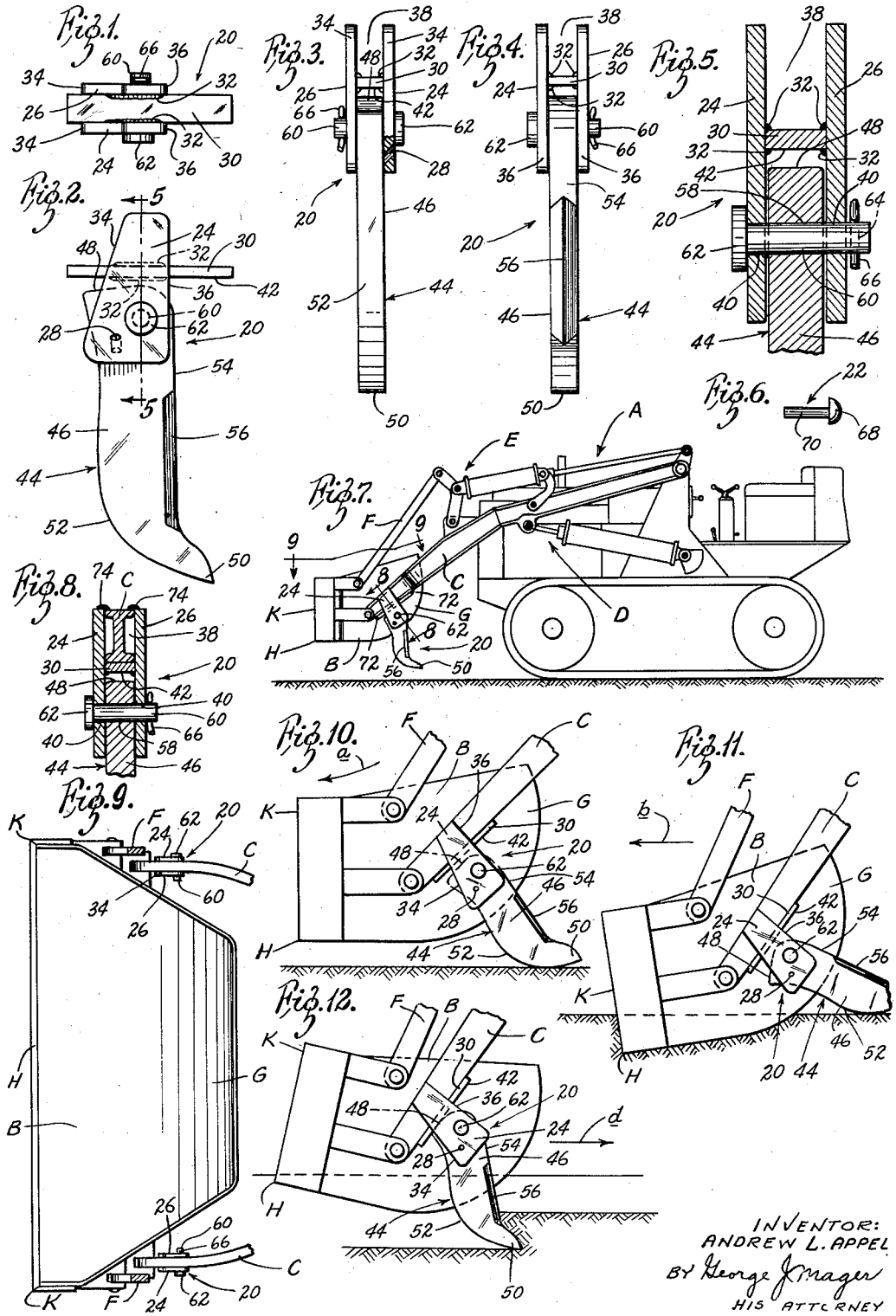
INVENTOR:
ANDREW L. APPEL
BY George J. Mager
HIS ATTORNEY

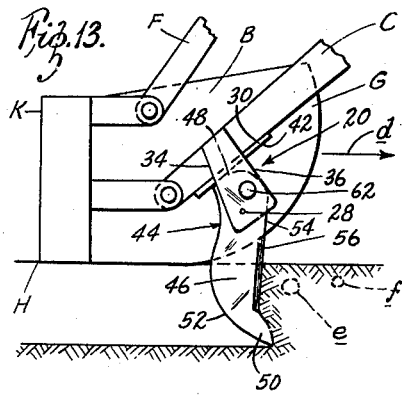
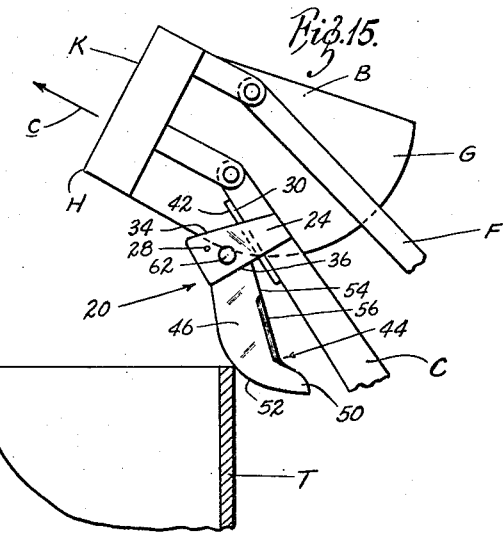
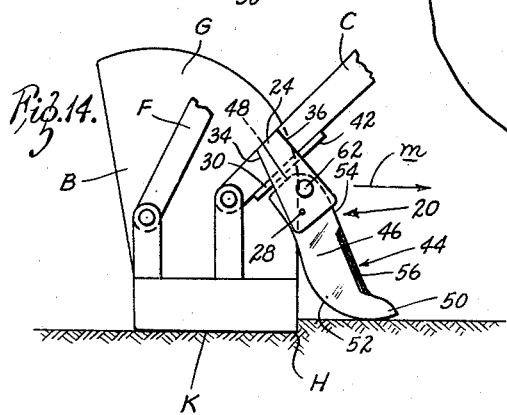
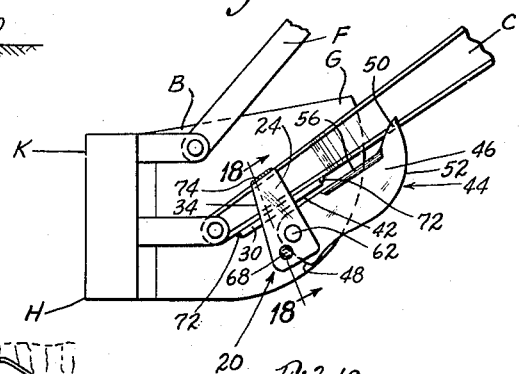
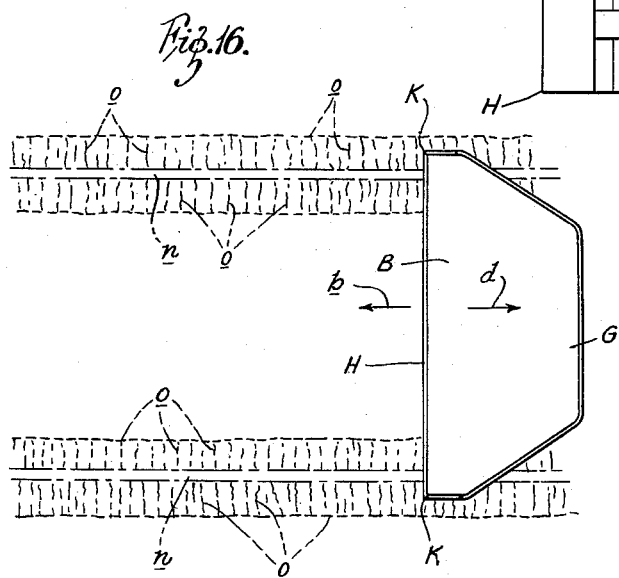
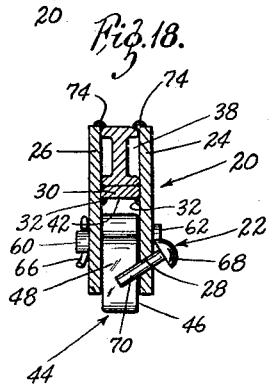

United States Patent Office 2,840,931
Patented July 1, 1958

2,840,931
SCARIFIER ATTACHMENT FOR TRACTOR MOUNTED SHOVEL LOADERS

Andrew L. Appel, Mehlville, Mo.

Application January 4, 1957, Serial No. 632,483

4 Claims. (Cl. 37—117.5)

The present invention relates generally to improvements in earth working equipment of the type that is operably mounted on a tractor.

More particularly stated, this invention relates to a novel scarifier assembly that may be readily incorporated in the earth working equipment of conventional tractor mounted shovel loaders.

The invention is in the form of an attachment comprising a unitary assembly that includes means for securing the attachment in place, means for performing scarifier and related operations, and means for placing the assembly in non-operative status.

The novel assembly of the invention is simple in construction, and when attached to one of the main loader arms of a shovel loader, it becomes operable automatically without requiring the addition of any operating mechanism.

Primarily, the scarifier assembly of my invention is designed for attachment to shovel loaders that are equipped with buckets having inwardly tapering rear end sections, but it is to be understood that the invention is not limited to that type of loaders.

Accordingly, the principal object of the present invention is to provide a novel and inexpensive but efficient scarifier assembly designed for attachment to tractor mounted shovel loaders.

It is another object to provide a scarifier assembly that, when incorporated in tractor mounted shovel loaders, will not require the addition of any mechanism in order to effect scarifier and related operations.

Another object of the invention is to provide a scarifier assembly in the form of an attachment for shovel loaders that is automatically effective during rearward movements of the loader provided the bucket is at or near ground level, but ineffective during forward movements.

It is a further object of the invention to provide a scarifier assembly adapted to function in various other capacities as will appear.

The invention is illustrated on two sheets of drawings that accompany this specification. A more comprehensive understanding of the invention, its features and advantages, may be had from the description thereof to follow with reference to said drawings, wherein Figure 1 is a top plan view of a scarifier assembly constructed in accordance with the concepts of the present invention;

Figure 2 is a side elevational view thereof;

Figure 3 is a front elevational view thereof;

Figure 4 is a rear elevational view thereof;

Figure 5 is a fragmentary enlarged vertical sectional view taken on the line 5—5 of Figure 2;

Figure 6 is an elevational view of a lock pin;

Figure 7 is a somewhat diagrammatical side elevational view of a tractor mounted shovel loader showing the present invention mounted thereon;

Figure 8 is an enlarged sectional view taken on the line 8—8 of Figure 7;

Figure 9 is an enlarged top plan view of the bucket end of the loader, the view being taken as indicated along the line 9—9 in Figure 7;

Figures 10 through 13 are exemplary schematic views demonstrating some of the operations that may be performed by the attached scarifier assembly responsive to boom and bucket dispositions of the shovel loader;

Figure 14 is an exemplary schematic view demonstrating the invention in use during what is known as a "back-dragging" operation;

Figure 15 is an exemplary schematic view demonstrating the invention during a loading operation;

Figure 16 is a view diagrammatically illustrating the primary objective of the present invention;

Figure 17 is a fragmentary side elevational view similar to Figure 7, illustrating the invention locked in non-operative status; and Figure 18 is an enlarged sectional view taken on the line 18—18 of Figure 17.

The scarifier assembly 20 of the present invention is illustrated in unattached status in Figures 1 through 5. A headed pin 22 associated therewith is shown in Figure 6. The assembly 20 includes a pair of spaced side plates, a bar connecting the side plates intermediate their upper and lower marginal edges, and a scarifier element supported from the side plates between them on a headed transverse pivot pin removably retained in position by a cotter key.

Numeral 24 designates the outer and numeral 26 designates the inner of said plates, they being counterparts as shown, except that the outer plate 24 has an angularly disposed circular opening 28 formed therein as shown particularly in Figure 3. The side plates are maintained in spaced relation by an elongated rectangular bar 30 that is welded thereto as indicated at 32.

The bar 30 extends beyond the front and rear marginal edges 34 and 36 respectively of the side plates as shown, and forms with the upper portions of said plates a cavity 38 for a purpose to appear. A pair of aligned circular openings 40 are provided in the side plates as best seen in Figure 8, these openings being formed on a determined plane below that of the undersurface 42 of the bar 30.

The scarifier element is designated in its entirety by the numeral 44, and will hereinafter be called a rooter. The novel configuration of the rooter 44 is most important as will appear. Thus, the body 46 thereof is contoured to provide a flat heel edge 48 at the top, a pointed toe 50 at the bottom, an arcuate forward edge 52, and a straight rearward edge 54 that has a V-shaped cutting section 56 formed therein intermediate said heel and toe areas as shown.

A transverse circular opening 58 is provided in the heel end portion of the rooter, and extending through said opening and the aligned openings 40 of the side plates is the shank 60 of a headed pivot pin 62, as best seen in Figure 5. The shank 60 projects beyond the inner side plate 26, and has a hole 64 therethrough for the reception of a cotter key 66. The locking pin accessory 22 includes a head 68, and a shank 70 having a diameter corresponding to that of the opening 28 in the outer side plate 24.

From the foregoing, it should be apparent that the invention provides an assemblage of elements that comprises a unitary structure which may readily be incorporated in tractor mounted shovel loaders, particularly of the type provided with buckets having inwardly tapering rear sections, as will be more clearly explained hereinafter.

A typical crawler or tractor loader is somewhat diagrammatically illustrated in Figure 7 and indicated A. It includes a bucket B pivotally supported from the front extremities of a pair of transversely spaced beams or main loader arms C that are incorporated in a hydraulically operable boom assembly generally indicated D. A hydraulically operable bucket-disposition control mechanism is indicated generally at E, and includes a pair of transversely spaced operating links F each pivotally connected at its lower end to the bucket B.

As shown particularly in Figure 9, the rear end section G of the bucket tapers inwardly, thus facilitating operability of the pivotal connections thereof with the main loader arms C and the trip or operating links F. The leading cutting edge of the bucket at the bottom is designated H, and said bucket is also equipped with side cutting edges each designated K. Inasmuch as the operations of shovel loaders such as that illustrated and generally described are well understood, it is not considered necessary to elaborate thereon herein.

Reverting to Figure 7, and with attention directed also to Figure 8, it should be apparent that attachment of the assembly 20 would be a simple operation. In order to facilitate the operation, the cotter key 66 would first be removed and the pivot pin 62 extracted, thus freeing the rooter 44. Thereupon, with that portion of the main loader arm C adjacent its pivotal connection disposed within the cavity 38, the bar 30 would be welded, as suggested at 72, to the undersurface of said arm. Next, welding 74 would be applied along the top edges of the side plates and the upper surface of said loader arm, (see also Figures 17 and 18). In consequence of this procedure, a rigid permanent support or bracket would be provided for the rooter 44, which would then be pivotally mounted therein as is understood.

It is noted in this connection, that the headed pivot pin 62 and cotter key 66 arrangement obviously provides for ready removal and replacement of the rooter 44 at any time thereafter. Thus for example after daily use over an extended period of time, it may be desirable to resharpen the tip of the toe 50, and the cutting edge 56. Although resharpening could be done without removal of the rooter, such action would tend to facilitate the sharpening operations.

It will of course be understood that a scarifier assembly 20 would be attached to both loader arms as illustrated in Figure 9. This view also demonstrates the location of the arms C, and thus the assemblies 20 thereto attached, to be inwardly of the side cutting edges K of the bucket B.

Operation

Although the mode of operation is believed apparent from the schematic views of the drawings, a brief description to augment these exemplary showings will be given.

Thus, assuming that an excavation project were under way, and the bucket B were being appropriately propelled downwardly and forwardly from, for example, the Figure 7 position to the Figure 10 position thereof as suggested by the arrow a, such directional movement would cause the arcuate forward edges 52 of the rooters to ride along the earth surface without in any way hampering normal operations.

Assuming now with reference to Figure 11, that the bottom cutting edge H and the side cutting edges K had penetrated the earth under continued forward movement of the bucket as suggested by the arrow b, the rooters 44 would continue to ride along the ground surface, and in addition would function as stabilizers for the bucket, in consequence of their relatively great weight.

Assuming next that sufficient earth had been scooped into the bucket to constitute a load as is understood, and it were desired to unload the earth into a truck, this operation would be performed in the customary manner. Thus as demonstrated in Figure 15, when the bucket is swung upwardly into dumping position as suggested by the arrow c, the arcuate portions 52 of the rooters would ride over the upper edge of the truck body T. After dumping, the empty bucket would be raised so that the rooters would clear said truck as the tractor backs off.

It will now be assumed that the ground is hard or perhaps frozen, and that it is deemed advisable to employ the rooters 44 to facilitate the succeeding excavating operation. In such cases, the loader arms C would be lowered while the shovel tractor A moves rearwardly as suggested by the arrow d in Figure 12. In consequence of such directional movement, the sharp tips of the rooter toes 50 would first penetrate the ground surface, and as the rearward movement of the tractor and the concurrent downward movement of the loader arms continued, the toe portions of the rooters would then penetrate more deeply into the earth. Simultaneously, the rooters 44 would rotate gradually in a clockwise direction, each about its pivot pin 62, until the heel portion 48 thereof would impinge against the undersurface 42 of one of the bars 30.

With the rooters 44 thus locked in scarifier position, furrows of various depths may be produced during rearward movements of the tractor, as a comparison of Figures 12 and 13 will demonstrate.

The primary function of the V-shaped cutting formation 56 is the severance of underground tree and vine roots suggested by the broken lines designated e in Figure 13, and buried wires and the like suggested by the broken lines designated f.

It is observed at this point, that when the invention is employed as demonstrated for example in Figures 12 and 13, the bucket B may be filled or partially filled with previously excavated earth, thus supplementing the weight of the bucket and loader arms whereby to effect deep penetration with negligible hydraulic down pressure. This would constitute an important time-saving factor in the course of certain operations.

Another important operation performed by shovel tractors is known as back-dragging, wherein with the bucket B disposed as demonstrated in Figure 14, the tractor movement is rearwardly, as suggested by the arrow m. In the course of such operations the rooters 44 would function in the capacity of side boards, thus enabling the bucket B to move a large quantity of loose earth rearwardly with greater facility. Back-dragging is frequently resorted to in clearance operations about newly constructed buildings, in ditches, and in the course of ground leveling operations. The Figure 14 demonstration of a back-dragging operation is of course exemplary only, in that the rooter 44 shown is riding rearwardly on the arcuate portion 52 thereof. Obviously, the tractor operator may effect a bucket disposition wherein the rooters would hang out of contact with the ground level.

With attention directed to Figure 16, it will be assumed that the rooters 44 are in full depth operation. At such time, the tips of the toes 50 would be approximately ten inches underground with said rooters in the locked position shown in Figure 13. With the tractor shovel loader A moving rearwardly as indicated by arrow d, furrows n approximately ten inches deep and two inches wide would result in actual practice. At the same time, the hard earth would be broken up on each side of the furrows n for approximately ten inches, as suggested by the undulant broken lines designated o.

It will be remembered that the rooters are located inwardly of the side cutting edges K. Therefore, assuming now that the tractor loader were driven forwardly with the bucket disposed in excavating position as in Figure 11 for example, the broken earth strips would greatly reduce the work of the side and bottom cutting edges K and H respectively. Consequently a full bucket of earth could be scooped more quickly, and with a minimum of wear and tear on the shovel mechanism, as should be understood.

Assuming now that for a given operation, it were more expeditious to render the scarifier assemblies inactive, each rooter 44 would be raised as shown in Figure 17, whereupon the lock pin 22 would be manually inserted into the opening 28 as demonstrated in Figure 18, thus maintaining the rooter in the inactive status shown.

This locking arrangement also provides other advantages. Thus for example, let it be assumed that the earth is hard along one side of an imaginary line and soft along the other side. Under that condition, only the rooter on the soft side would be locked out of action. Again, let it be assumed that a drainage ditch were contemplated. This operation would be performed by one rooter in action, with the other locked to inoperative position. That is to say, the active rooter would be drawn rearwardly to form two or three narrowly separated furrows, following which the broken ground could be quickly removed by a hand shovel.

There are additional operations that may be performed with the aid of the scarifier assemblies under consideration by a skilled shovel loader operator, but these will not be described inasmuch as the foregoing description and the comprehensive drawings are believed adequate for a complete understanding of this invention.

Inasmuch as the cross-sectional dimensions of main loader arms may not be uniform, it is to be understood that my invention contemplates any changes that may be required in the shape and spacing of the side plates in order to provide for rigid attachment of the scarifier assemblies to said arms.

What I claim is:

1. A scarifier attachment for the main loader arm of a tractor mounted shovel loader, said attachment comprising in assembly: a pair of transversely spaced similarly contoured vertical side plates; an angularly disposed circular opening in one of the side plates; a flat rectangular bar connecting the side plates intermediate their upper and lower edges, the ends of the bar extending beyond the front and rear marginal edges of said plates, and said bar and the portions of said plates disposed thereabove defining a cavity for hte reception of and welding thereinto of a forward end portion of said main loader arm; a pair of aligned circular openings formed in the side plates on a determined plane below the undersurface of said bar; a rooter element having a cricular opening in the upper end portion thereof; a headed pin having a shank extending transversely through the circular opening in the rooter and the similar openings in the side plates to pivotally suspend said rooter between said plates, the end portion of said shank projecting beyond one of the plates and having a hole therethrough for the reception of a cotter key whereby to removably retain said pin in position; a heel formation on the upper end of the rooter element adapted to engage the undersurface of the flat bar for limiting pivotal movements of said rooter in a clockwise direction when said shovel loader is moving rearwardly; and a headed pin for insertion into said angular opening with the rooter having been swung upwardly in a counterclockwise direction whereby to releasably lock said rooter in raised non-operative disposition.

2. In a scarifier assembly for ready attachment to a main loader arm included in the boom of a tractor mounted shovel loader: a pair of similar transversely spaced vertical plates including an outer and an inner plate; an elongated rectangular bar rigidly connecting said plates intermediate their upper and lower marginal edges whereby to define a cavity for the reception of and welding thereinto of a forward end portion of said loader arm with the elongated bar engaging the undersurface of the arm; aligned circular openings in the plates on a determined plane below the undersurface of said bar; a rooter having a circular opening in the upper end portion thereof, said opening being of a size corresponding with the circular openings aforesaid in the plates and being formed on said determined plane below the undersurface of said rectangular bar; a headed pivot pin including a shank extending through said circular opening in the rooter and the similar openings in the side plates, the end portion of the shank projecting beyond the inner plate and having a hole therethrough for the reception of a cotter key whereby to removably retain said pin in position; a heel formation on the upper end of the rooter adapted to impinge against the undersurface of the elongated bar whereby to limit pivotal movements of the rooter in a clockwise direction; an angularly disposed circular opening in the outer plate; and a headed pin insertable in said angularly disposed opening of the outer side plate, after said rooter has been swung upwardly about said pivot pin in a counterclockwise direction, whereby to positively lock the rooter against pivotal movements in any direction.

3. In a scarifier assembly for ready attachment to a main loader arm included in the boom of a tractor mounted shovel loader, the combination of a rooter element comprising a body having a flat heel edge at the top, a pointed toe at the bottom, an arcuate forward edge, a straight rearward edge having a V-shaped cutting section formed therein intermediate said heel and toe areas, and a circular opening extending through the upper end portion of the body; a pair of similar vertical side plates including an outer and an inner plate connected intermediate their upper and lower marginal edges in transversely spaced relation by means of an elongated rectangular bar, said bar defining, with the portions of said side plates thereabove, a cavity whereinto a forward portion of said main loader arm is adapted to be received and welded to the bar and the side plate portions defining said cavity; a circular opening in each side plate at a determined plane below the said elongated bar; a pivot pin extending through said plate openings and the similar opening aforesaid in the rooter element; means for releasably maintaining said pivot pin in place; and means for releasably locking the rooter in non-operative position; said heel edge at the top of the rooter element being adapted to impinge against the underside of said elongated bar whereby to limit pivotal movements of the rooter in a clockwise direction; said pointed toe at the bottom of the rooter being adapted to first penetrate the ground responsive to lowerings of said loader arm, and to thereafter produce furrows of various depths in the ground responsive to rearward movements of the tractor; said V-shaped cutting section being adapted to sever roots, wires, and the like encountered by the rooter in the course of producing said furrows.

4. A scarifier assembly in the form of an attachment adapted to be readily secured to a tractor mounted shovel main loader arm, said assembly comprising in combination: means for mounting the assembly on the forward end portion of said loader arm, said means comprising the upper portions of a pair of transversely spaced side plates rigidly connected intermediate their upper and lower ends by an elongated flat bar; means for performing scarifier and related operations, said means comprising a rooter element swingably mounted between the lower portions of said pair of plates on a transverse pivot pin disposed in a determined plane below said elongated bar and having its ends supported in coplanar circular openings provided therefor in the plates; means for removably maintaining said pin in pivotal position; means limiting swinging movements of the rooter element in a clockwise direction, said means comprising a heel formation on the upper end of said rooter element adapted to engage the undersurface of said elongated flat bar when with said rooter element disposed in scarifier position said tractor mounted shovel moves rearwardly; and means adapted to releasably lock the rooter element against swinging movements in any direction whereby to maintain said element in non-operative position.

References Cited in the file of this patent

UNITED STATES PATENTS

| 2,468,380 | Smith | Apr. 26, 1949 |
| 2,654,967 | Small | Oct. 13, 1953 |
| 2,684,617 | Johnston | July 27, 1954 |
| 2,695,468 | MacLeod et al. | Nov. 30, 1954 |